(12) United States Patent
Cheng et al.

(10) Patent No.: US 11,972,141 B2
(45) Date of Patent: Apr. 30, 2024

(54) METHOD FOR DATA TRANSMISSION AND DATA-PROCESSING CIRCUIT

(71) Applicant: REALTEK SEMICONDUCTOR CORP., Hsinchu (TW)

(72) Inventors: Yun-Teng Cheng, Hsinchu (TW); Hua-Juan Zhang, Suzhou (CN)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 217 days.

(21) Appl. No.: 17/719,495

(22) Filed: Apr. 13, 2022

(65) Prior Publication Data

US 2022/0334763 A1  Oct. 20, 2022

(30) Foreign Application Priority Data

Apr. 14, 2021 (CN) .......................... 202110399451.7

(51) Int. Cl.
*G06F 3/06* (2006.01)
*G06F 13/40* (2006.01)

(52) U.S. Cl.
CPC .......... *G06F 3/0656* (2013.01); *G06F 3/0604* (2013.01); *G06F 3/0671* (2013.01); *G06F 13/4018* (2013.01)

(58) Field of Classification Search
CPC .... G06F 3/0656; G06F 3/0604; G06F 3/0671; G06F 13/4018
See application file for complete search history.

(56) References Cited

U.S. PATENT DOCUMENTS

| 5,613,078 | A | * | 3/1997 | Kishigami | .......... G06F 13/1678 712/33 |
| 6,700,582 | B2 | | 3/2004 | Cheng | |
| 7,890,668 | B2 | * | 2/2011 | Casper | ................ G06F 12/1036 711/100 |
| 10,324,651 | B2 | | 6/2019 | Ngu | |
| 2014/0105396 | A1 | * | 4/2014 | Engelien-Lopes | .... H04W 12/04 380/270 |
| 2019/0392551 | A1 | * | 12/2019 | Huang | .................. G06F 3/0604 |

FOREIGN PATENT DOCUMENTS

| TW | 477930 B | 3/2002 |
| TW | 201807580 A | 3/2018 |

* cited by examiner

*Primary Examiner* — Henry Tsai
*Assistant Examiner* — John B Roche
(74) *Attorney, Agent, or Firm* — Li & Cai Intellectual Property (USA) Office

(57) ABSTRACT

A method for data transmission and a data-processing circuit are provided. The data-processing circuit includes a memory that implements a buffer and a controller for controlling an operation of the data-processing circuit. When the data-processing circuit receives input data, data-hot-bits are used to address multiple data blocks of the input data. After analyzing the data-hot-bits, a starting address and a data length of each of the data blocks can be obtained. The input data is written to the buffer according to information analyzed from the data-hot-bits, and the data-hot-bits achieve an effect of masking the dummy data address. Further, data dependency among the data blocks can be confirmed by comparing the data-hot-bits with respect to each of the data blocks before the data blocks are written to the buffer.

16 Claims, 6 Drawing Sheets

METHOD FOR DATA TRANSMISSION AND DATA-PROCESSING CIRCUIT

CROSS-REFERENCE TO RELATED PATENT APPLICATION

This application claims the benefit of priority to No. 202110399451.7, filed on Apr. 14, 2021 in People's Republic of China. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a technology of data transmission, and more particularly to a method for data transmission that is able to reduce data-processing cycles by addressing valid data and a circuit thereof.

BACKGROUND OF THE DISCLOSURE

In a conventional technology for data transmission, a restriction of a width maximum input transaction size of a write buffer of a circuit system defines a chop size boundary, which is defined by the width maximum input transaction size of the write buffer that cannot exceed a size boundary. One of the limitations of the width maximum input transaction size is a bus width of the circuit system. With 128 bytes bus width as an example, if the width maximum input transaction size is 64 bytes, a process for data transmission is divided into two procedures via the circuit system before reaching the restriction of the width maximum input transaction size of the write buffer.

Since the conventional process for data transmission can be restricted by a fixed access width of a slave device that is defined as the device to receive data, the circuit system can transmit data based on the fixed access width of the slave device to write data to a buffer and then the slave device, and a size of each piece of the data in the transmission process is configured to be fixed. Due to a writing mechanism of the buffer in the circuit system, the circuit system can use a chopping command in the process of data transmission. Further, through the restriction of the fixed access width of the slave device that receives data, it is necessary for the circuit system to generate dummy data that aligns with the width maximum input transaction size of the buffer and the fixed access width of the slave device based on an actual status of the process.

FIG. 1 is a schematic diagram depicting dummy data created in a circuit system. An input data 100 is written to a memory 10 of the circuit system. The memory 10 implements a buffer in the circuit system. The circuit system then transmits the data in the buffer to a slave device 101. During a process of data transmission, the input data to be written to the buffer is restricted by a width maximum input transaction size that defines a chop size boundary of the buffer, a fixed access width of the slave device, and a bus width. For example, the width maximum input transaction size of the buffer is 64 bytes, the fixed access width of the slave device is 32 bytes, and the bus width is 16 bytes.

When the circuit system is in operation, a push command used for writing data to the buffer is converted to two pop commands. The push command is used to stack new data in the buffer, and the pop command is used to retrieve data from the buffer. The addresses of the memory of the slave device 101 are 0x40, 0x50, 0x60, and 0x70. In the process of data transmission, when the data is pushed to the addresses 0x50 and 0x60 of the memory, dummy data 103 is used to fill in the addresses 0x40 and 0x70 of the memory 10 to align with the fixed access width of the slave device 101. The dummy data in the memory 10 is labeled as "dum." In the present example, the data is pushed to the memory 10 via a bus 105 from a starting address 104, i.e., address 0x40. Afterwards, in the memory 10, the four data are outputted to the slave device 101 by the two pop commands that are used to retrieve data from the memory 10.

When a critical timing and complexity of hardware are of consideration in the conventional technology, the circuit system needs to check data dependency of the data in the buffer during data transmission, in order to ensure the data accuracy under restriction of the width maximum input transaction size. According to the width maximum input transaction size of the buffer, the input data should be compared with the addresses in the buffer. FIG. 2 is a schematic diagram depicting a process of checking the data dependency during data transmission.

For example, the data dependency can be checked by using an instruction of a data-processing circuit to check whether or not it is necessary to read the data address before writing data to the buffer. If the data-processing circuit needs to read the data address, it indicates that the data in the corresponding data address of the buffer cannot be read from the buffer until the data is written to the buffer since the current data is old and inaccurate. On the contrary, if the data-processing circuit does not obtain the data to be read in the data address, it indicates that the data in the corresponding data address of the buffer can be read since there is no dependency.

In the schematic diagram shown in FIG. 2, the width maximum input transaction size of the buffer is 64 bytes and a bus width is 16 bytes. The diagram also shows that the bus width is from 0x40 to 0x7f and the data addresses are ranged from 0x40 to 0x70. An input instruction should be separated into two or more write commands when writing the data. The write commands include a first command 201 that is used to write a portion of input data 121 to addresses 0x50 and 0x60 of the buffer. The write commands include a second command 202 that is used to write another portion of the input data 121 to address 0x70 of the buffer. The circuit system checks data dependency 203 under different commands. The data dependency can be confirmed if the data being transmitted by different commands is within a chop size boundary that is formed according to the width maximum input transaction size of the buffer. On the contrary, if the data is outside the chop size boundary, i.e., the data is not in any of the addresses 0x40 to 0x70 of the buffer, there is no data dependency. When the data is buffered, the data cannot be buffered in the address 0x70 of the buffer until the data in the address 0x50 of the buffer is outputted. However, when the data dependency is confirmed for many times, the data with the data dependency cannot be operated at the same time since it brings a greater impact on hardware performance.

In the conventional technology, a data hazard occurring in the buffer can be checked according to the chop size boundary formed via the width maximum input transaction size of the buffer. Because of the more concentrated and dense addresses of the transmitted data, the loading of hardware performance increases with a higher incidence of the data dependency. The size of the data to be accessed is fixed for the slave device. When the data written to the buffer does not align with the fixed access width of the slave device, dummy data is required for the buffer of the circuit system. However, the dummy data causes an additional processing procedure and also reduces the performance of inputting data to the buffer.

Furthermore, the data with the same chop size boundary does not mean there is data dependency, and the determination of the data hazard in the conventional technology is not accurate enough when only the alignment of the data inputted to the buffer is considered. This determination results in unnecessary processes for confirming the chop size boundary when the data dependency is being checked.

SUMMARY OF THE DISCLOSURE

In response to the above-referenced technical inadequacies, the present disclosure provides a method for data transmission that is applied to a data-processing circuit having a buffer. Data hot bits are particularly used to address data blocks that are divided from the buffer due to a restriction of a width maximum input transaction size of the buffer. In the meantime, multiple write commands are generated according to the multiple data blocks for writing the input data to the data blocks of the buffer. It should be noted that the data hot bits are defined as the bit representing a bus-width address that can be a valid or a dummy in a specified address boundary.

In the method for data transmission, when the input data is received, the data hot bits are used to address the multiple data blocks of the input data. After resolving the data hot bits, starting addresses and data lengths of each of the data blocks can be obtained. The data is then written to the buffer based on the starting addresses and the data lengths.

Further, before the multiple data blocks are written to the buffer, data dependency among the data blocks can be firstly confirmed by comparing the data hot bits of the data blocks. If no data dependency is determined among the data blocks, the input data is directly written to the buffer; if the data dependency is determined among the data blocks, the input data is not read from the buffer until after the input data is written to the buffer.

Preferably, the input data is transmitted to a slave device from a master device via the data-processing circuit, and the slave device reads the input data from the buffer. During the data transmission, the mechanism using the data hot bits to address the data blocks of the input data is based on a restriction that requires the input data to align the data addresses in the buffer during data transmission.

Thus, when the data is written to the buffer, the data can be read from the buffer by the slave device according to the information resolved from the data hot bits. The information resolved from the data hot bits includes starting addresses and data lengths of each of the data blocks. The method provided by the present disclosure achieves an effect of masking the conventional dummy data.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
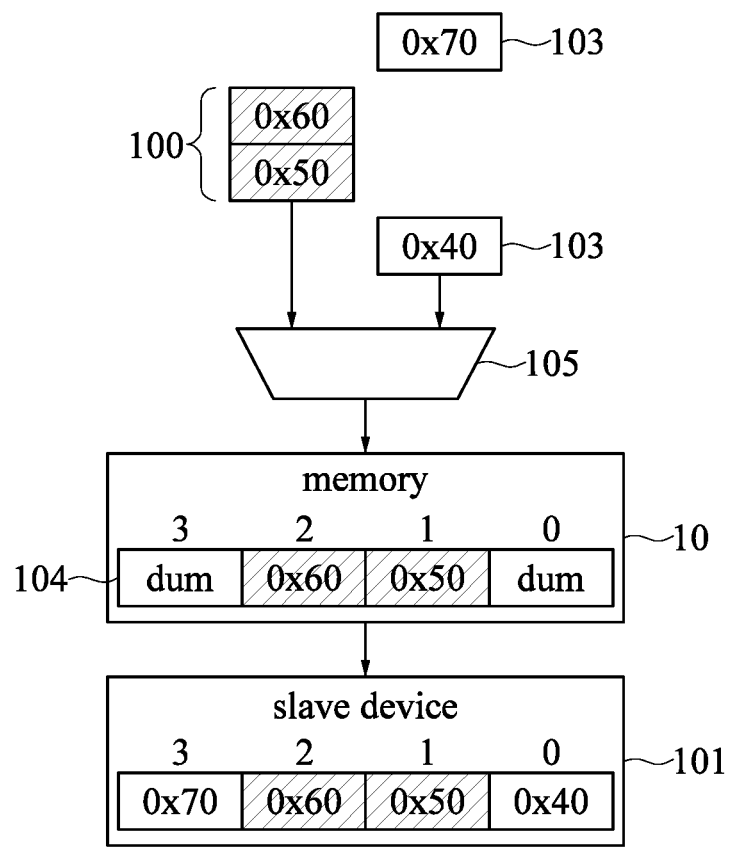
FIG. 1 is a schematic diagram of dummy data being created in a circuit system in a conventional technology.
Figure 2:
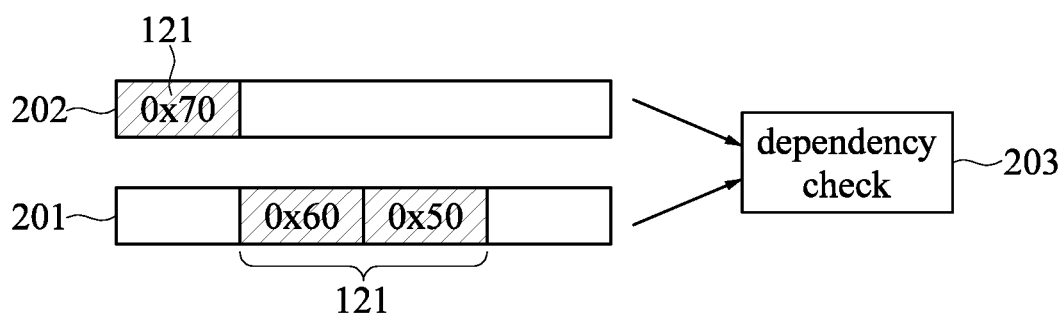
FIG. 2 is a schematic diagram depicting data dependency being checked in a process of data transmission in the conventional technology.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Due to many restrictions, the performance of a conventional data-processing circuit is reduced, and the loading of the hardware thereof is increased by various processing procedures for confirming data accuracy. The present disclosure provides a method for data transmission and a data-processing circuit that are capable of reducing loading for solving data hazard. The above-mentioned restrictions, such as the data transmission is restricted by a chop size boundary defined by a width maximum input transaction size, a fixed access width, and a bus width of a slave device. In the method for data transmission of the present disclosure, a mechanism for solving data hazard with data hot bits is introduced in the data-processing circuit. It is different from the conventional technology that requires a starting address and a data length of a memory (e.g., a buffer) before storing the data to the memory, the method using the data hot bits additionally records an address range for inputting data to the buffer of the data-processing circuit and simultaneously updates a push command which is used to access the data in the conventional technology as a pop command of the present disclosure. The data hot bits are used to indicate the addresses of dummy data and therefore it is unnecessary to create the dummy data for filling in the smallest indivisible unit as receiving data in order for it to adapt to a receiver, i.e., a slave device. Accordingly, the method provided by the present disclosure can effectively reduce the unnecessary data-processing process, so as to enhance the performance of the data-processing circuit. It should be noted that the data hot bits are defined as the bit representing a bus-width address that can be a valid or a dummy in a specified address boundary.

The method for data transmission of the present disclosure provides a low-cost and a high-performance solution to solve the problem of data hazard. The technical problem to be solved relates to that a read command and a write command in a data-processing circuit can frequently reorder an original process for achieving a high performance, but large numbers of read and write actions may result in data hazard. Therefore, an additional process may be required to handle data consistency for preventing the data hazard. The method for data transmission of the present disclosure uses the mechanism for solving data hazard with data hot bits to address the valid data in order to reduce the number of writes. The method can also solve the problem caused by aligning the fixed access width required by some specific devices, such as the slave device relative to a master device. The mechanism of the data hot bits can effectively enhance the write performance of the data-processing circuit.

The above-mentioned bus width can be defined as a total amount of data (frequency*width, bytes/sec) to be transmitted in a unit time. The data hot bits are the bits for indicating each of bus-width addresses in a circuit that implements the method for data transmission. The data hot bits are used to address the valid addresses and the dummy addresses in the bus-width address and the chop size boundary. Every data hot bit corresponds to a starting address of one data block.

In an exemplary example, a data with a data length 3 has a starting address 0x20 and a data block has a width with memory addresses 0x20 to 0x2f. A width maximum input transaction size of a buffer is 128 bytes and a width of the data is 128 bits. One of the data hot bits indicates a valid data address 0x20 of the buffer during a process of data transmission, another bit indicates another valid data address 0x30, and one further bit indicates a valid data address 0x40. Further, several additional bits can indicate invalid data addresses 0x70, 0x60, 0x50, 0x10 and 0x00.

Figure 3:
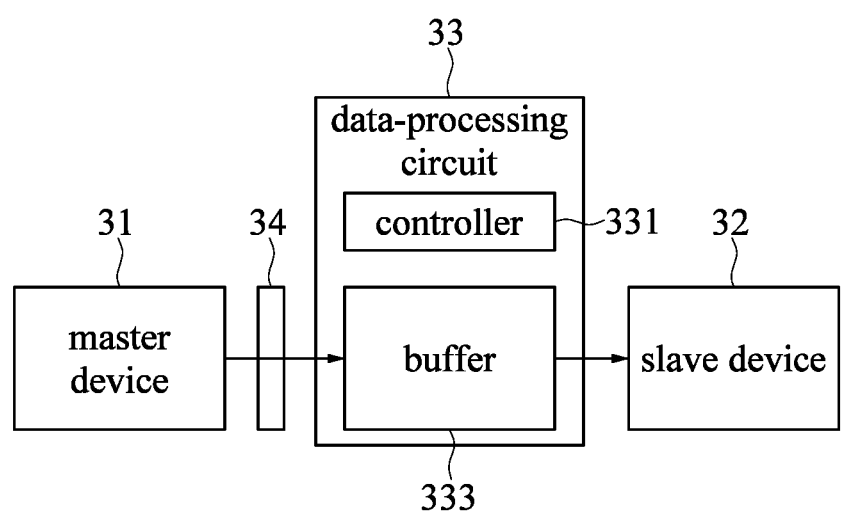
FIG. 3 is a schematic circuit diagram depicting a data-processing circuit that performs the data transmission according to one embodiment of the present disclosure.

Reference is made to FIG. 3, which is a schematic diagram depicting a circuit to which the method for data transmission is applied according to one embodiment of the present disclosure. A data-processing circuit 33 shown in the diagram is used to handle a transmission procedure to transmit data from a master device 31 to a slave device 32. The transmission procedure includes a process of checking data hazard for confirming data dependency. A controller 331 of the data-processing circuit 33 controls operations of the circuit. One of the operations controlled by the controller 331 is such as using a push command and a pop command to access data in a buffer 333. The buffer 333 can be a buffer circuit embodied by a memory, e.g., SRAM, of the data-processing circuit 33.

The master device 31 generates data and transmits the data to the data-processing circuit 33 via a bus 34. In the data-processing circuit 33, the data is written to the buffer 333 via a write command Next, the slave device 32 reads the data in the buffer 333 via a read command. In the meantime, the data-processing circuit 33 can confirm whether or not the data is correctly written to some specific addresses of the buffer 333 for solving the possible data hazard. The slave device 32 may read wrong data if the circuit does not check data dependency or if the data is not correctly written to the buffer.

According to the above-described method, the controller 331 of the data-processing circuit 33 compares the data addresses in the buffer 333 in order to confirm the data dependency of the input data and determine whether or not any data hazard exists. After the data dependency is confirmed, the data to be checked can be read from the buffer 333 by the slave device 32.

In the method for data transmission, when the data is written to the buffer 333 of the data-processing circuit 33, the controller 331 uses the data hot bits to address the data by recording the data addresses of the data with a specific format. Rather than the conventional technology, the method provided by the present disclosure does not fill in the dummy data from the starting address of the buffer 333 according to the data length that is aligned with the fixed access width of the slave device 32 which receives the data. It should be noted that not only the data hot bits which are used to address the valid data can exclude the problem of data hazard, but also enhance the performance of the data-processing circuit 33 by masking the data addresses used for the dummy data since the duty cycles of filling in the dummy data can be saved.

Figure 4:
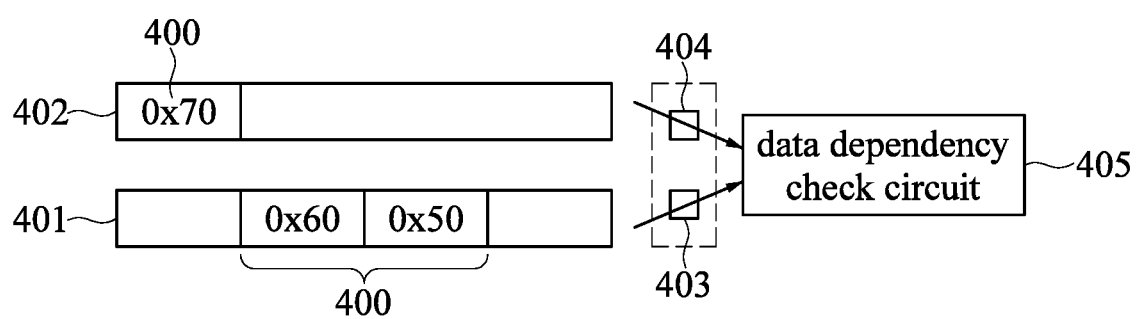
FIG. 4 is a schematic diagram depicting data hot bits operating in the data-processing circuit according to one embodiment of the present disclosure.

Reference is made to FIG. 4, which is a schematic diagram depicting that the data hot bits in the method for data transmission are used to check data hazard according to one embodiment of the present disclosure.

In the diagram, a memory of the data-processing circuit implements a buffer. In the buffer, a write command can be divided into multiple commands according to a bus width, in which a first command 401 is used to write a portion of input data 400 to addresses 0x50 and 0x60 of the buffer, and a second command 402 is used to write another portion of the input data 400 to an address 0x70 of the buffer. In an exemplary example, the memory such as a SRAM of the data-processing circuit can be divided into four blocks if the width maximum input transaction size of the buffer is 64 bytes and the bus width is 128 bits. The first command 401 is used for a first data transmission procedure and a first data hot bit (e.g., 4'b0110) 403 that records an address of the data to be transmitted via the first command 401. The second command 402 is used for a second data transmission procedure and a second data hot bit (e.g., 4'b1000) 404 that records another address of the data to be transmitted via the second command 402.

Next, a data dependency check circuit 405 of the data-processing circuit checks the data dependency in the buffer. For example, an 'AND' operation is used to compare the first data hot bit (e.g., 4'b0110) 403 with the second data hot bit (e.g., 4'b1000) 404 for confirming if any data to be read exists in the address of the buffer. The address is consistent with the memory address of the slave device. The data dependency can be checked according to a comparison result. In an exemplary example, if the data address of the data to be read is '0x50', the data can be read from the buffer if there is data in the corresponding address of the buffer. Otherwise, if the corresponding address of the buffer has no data, the data cannot be read until the buffer has the data in the corresponding data address.

If there is no data dependency, the data in the buffer has no dependency, and the data in the address recorded by the second data hot bit 404 can be pushed to the buffer without filling in any dummy data. The method can also reduce the times of checking the data dependency and improve the performance of the data-processing circuit.

Figure 5:
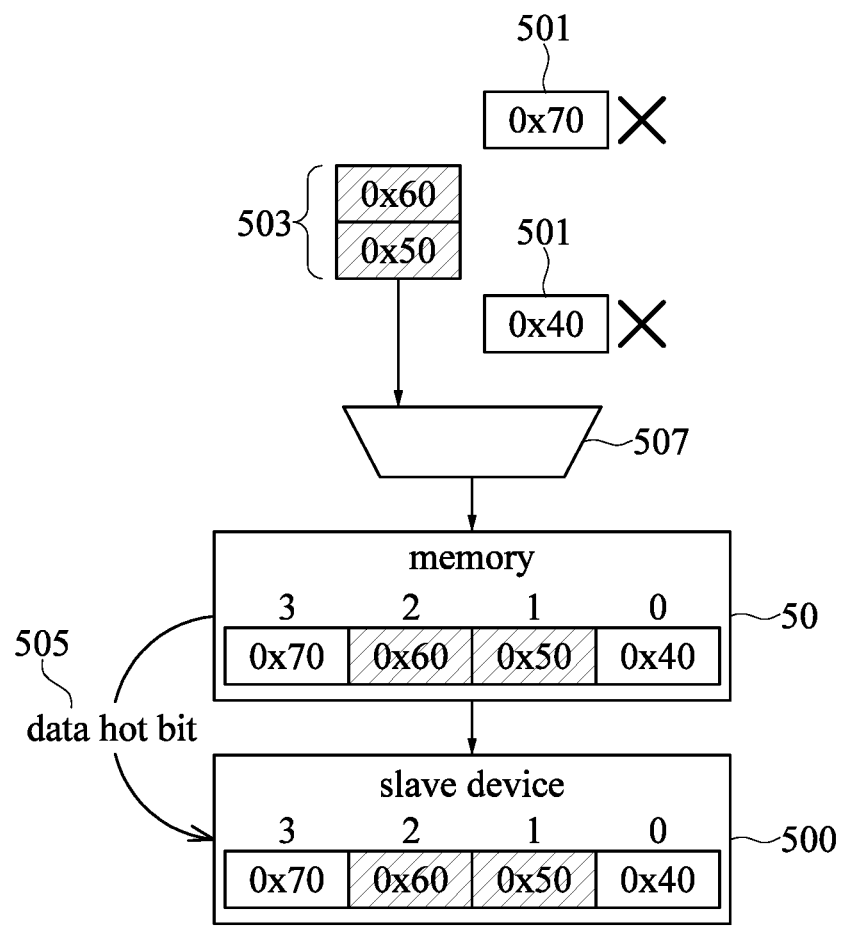
FIG. 5 is a schematic diagram depicting operations of writing data and reading data from a buffer in one embodiment of the present disclosure.

FIG. 5 is a schematic diagram depicting operations of writing data into a buffer in one embodiment of the present disclosure. When the slave device 500 reads data from the buffer, e.g., the data in the addresses 0x50 and 0x60 of the buffer, the data hot bits are used to mask the addresses of the dummy data that is originally used to fill in the addresses 0x40 and 0x70 of the buffer. The related processes in the data-processing circuit can be saved when writing data to the slave device. In the present example, the data is pushed to the addresses 0x50 and 0x60 of the buffer, i.e., a memory 50, via a bus 507 without writing the dummy data 501 to the buffer (i.e., the addresses 0x40 and 0x70). Therefore, the push program that originally requires 4 writing cycles can be reduced to 2 cycles.

Further, in the present example, the addresses 0x40 to 0x70 of the buffer indicate the width maximum input transaction size of the buffer. In the process of data transmission, an input data 503 is written to the buffer via the bus 507. Valid data can be determined according to a bus width of the bus 507 and the fixed access width of the slave device 500 which receives the data. A pop command is used to read data from the buffer according to addressing information recorded in a data hot bit 505. The data-processing circuit can therefore identify the data addresses of the dummy data 501 which is originally filled in the buffer according to the addressing information of the valid data in the data hot bit 505, e.g., the addresses 0x50 and 0x60. The data-processing circuit accordingly masks the addresses (e.g., 0x40 and 0x70) originally set for the dummy data 501 when writing data to the slave device 500, such that the input data 503 can be successfully written to the memory of the slave device 500.

The mechanism of using the data hot bit 505 in the process of data transmission successfully saves the cycles of writing the dummy data and transmitting the dummy data, and therefore also reduces the number of times of checking data dependency, so as to enhance the performance of the data-processing circuit.

Figure 6:
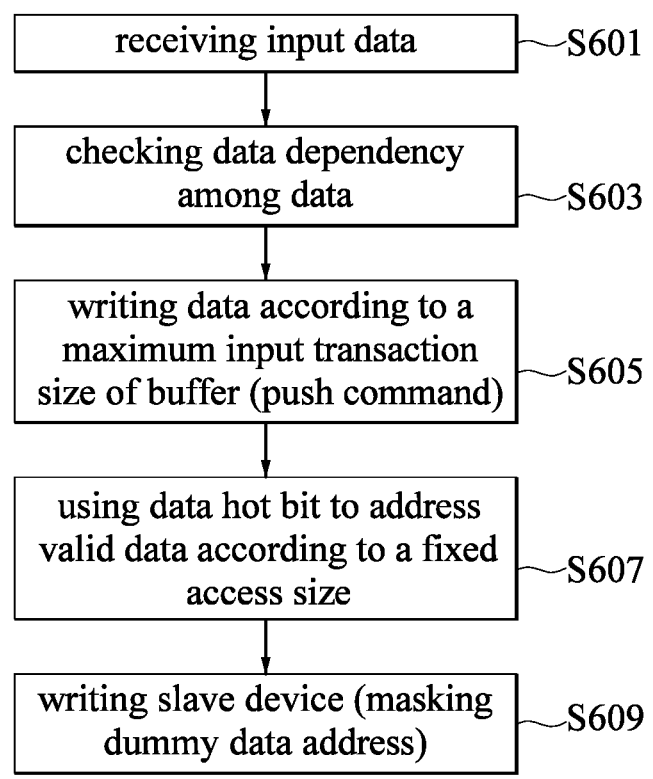
FIG. 6 is a flow chart describing a method for data transmission according to one embodiment of the present disclosure.

In view of above embodiments, reference is made to FIG. 6, which is a flow chart describing the steps of the method for data transmission according to one embodiment of the present disclosure.

In the beginning, a master device generates data and a data-processing circuit receives the input data (step S601). Next, the data-processing circuit checks data dependency of the input data (step S603). In this step, some data hot bits are set for addressing the starting addresses of each of the data blocks of the input data. The data hot bits can also record the data lengths of the data blocks with a specific transmission format. The data-processing circuit divides the input data into multiple data blocks because of a restriction of a width maximum input transaction size of the buffer. Multiple write commands are also generated according to the multiple data blocks. In step S605, the data-processing circuit uses a push command to write each of the data blocks to the buffer according to the width maximum input transaction size of the buffer. It should be noted that the input data is transmitted to the slave device from the master device via the data-processing circuit, and during the data transmission a mechanism using the data hot bits to address the data blocks is based on a restriction that requires the input data to align the data addresses in the buffer during data transmission.

Afterwards, the slave device resolves the data hot bits to acquire the starting addresses and the data lengths of the data blocks when it is ready to use a pop command to read data from the buffer. A checking circuit of the data-processing circuit uses the information resolved from the data hot bits to check the data dependency, so as to confirm the data dependency in the buffer (step S607).

An instruction in the data-processing circuit checks whether or not it is necessary to read the data addresses of the input data before the data is written to the buffer. If the data addresses of the data are required to be read, the data in the corresponding data addresses of the buffer is old, which means the data-processing circuit needs to wait for the data to be written to the buffer before it reads the data in the buffer. On the contrary, if the data-processing circuit does not yet obtain the data addresses of the data to be read, the data-processing circuit can read the data corresponding to the addresses in the buffer.

Thus, the data-processing circuit relies on the data hot bits to address the valid input data. The data-processing circuit can enhance the performance because the operating cycles for writing the dummy data are saved. Through the data hot bits, not only can the data hazard be excluded, but also the data addresses that should have written the dummy data can be masked.

Afterwards, the slave device decodes the input data and obtains the addressing information of the data hot bits. The addressing information includes a starting address and a data length. Therefore, the data-processing circuit can read out the data from the buffer according to the data hot bits that include the starting addresses of each of the data blocks of the input data and the data lengths of each of the data blocks. The data hot bits allow the slave device to achieve the effect of masking the addresses of the dummy data when the data is written to the slave device (step S609). If it is necessary, the slave device still needs to supplement the data which is not yet read, e.g., to fill in the data blocks that require to be filled with dummy data, for aligning with a fixed access width of the slave device.

Accordingly, the method for data transmission of the present disclosure can reduce the use of the dummy data for enhancing the performance and also ensure that the data transmission process will not be affected by data hazard through the data hot bits.

In conclusion, according to the above embodiments of the method for data transmission and the data-processing circuit, under a master-slave architecture, the data-processing circuit is able to process data transmission and format conversion between the master device and the slave device, e.g., between the circuits in a computer system that need to access data in the memory. In the method, instead of setting up the starting address and the data length in the conventional technology, the mechanism using the data hot bits in the data-processing circuit of the present disclosure is to address the valid data for excluding the data hazard. The mechanism also saves the procedure to fill in the dummy data if the data does not align with the width maximum input transaction size of the buffer. Further, the method can continue to check the data hazard in the data-processing circuit for improving the accuracy to the bus level, so as to reduce processing times of data dependency and enhance performance of the data-processing circuit.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for data transmission, applied to a data-processing circuit having a buffer, comprising:
    receiving an input data;
    using data hot bits to address multiple data blocks of the input data; and
    resolving the data hot bits, so as to acquire starting addresses and data lengths of each of the data blocks, and writing the input data to the buffer based on the starting addresses and the data lengths.

2. The method according to claim 1, wherein the input data is transmitted to a slave device from a master device via the data-processing circuit, the slave device reads the input data from the buffer and uses a mechanism addressing the data hot bits based on a restriction that requires the input data to align with the data addresses in the buffer during data transmission.

3. The method according to claim 1, wherein, before the multiple data blocks are written to the buffer, data dependency among the data blocks is firstly confirmed by comparing the data hot bits of each of the data blocks.

4. The method according to claim 2, wherein, if no data dependency is determined among the data blocks, the input data is directly written to the buffer; if the data dependency is determined among the data blocks, the input data is not read from the buffer until after the input data is written to the buffer.

5. The method according to claim 4, wherein the input data is transmitted to a slave device from a master device via the data-processing circuit, the slave device reads the input data from the buffer and uses a mechanism addressing the data hot bits based on a restriction that requires the input data to align with the data addresses in the buffer during data transmission.

6. The method according to claim 1, wherein the input data is divided into the multiple data blocks according to a restriction of a width maximum input transaction size that allows the input data to be written to the buffer, and multiple write commands are generated according to the multiple data blocks for writing the input data to the buffer.

7. The method according to claim 6, wherein the input data is transmitted to a slave device from a master device via the data-processing circuit, the slave device reads the input data from the buffer and uses a mechanism addressing the data hot bits based on a restriction that requires the input data to align with the data addresses in the buffer during data transmission.

8. The method according to claim 7, wherein a transmission of the input data to be written to the buffer is restricted by a chop size boundary defined by the width maximum input transaction size that is written to the buffer, a fixed access width of the slave device, and a bus width.

9. The method according to claim 8, wherein, after the input data is written to the buffer, the slave device reads data from the buffer according to information resolved from the data hot bits, in which the information resolved from the data hot bits includes the starting addresses of each of the data blocks, and the slave device retrieves the data based on the data lengths, so as to achieve an effect of masking dummy data addresses.

10. A data-processing circuit, comprising:
    a memory implementing a buffer; and
    a controller used to control an operation of the data-processing circuit;
    wherein, when the data-processing circuit receives an input data, data hot bits are used to address multiple data blocks of the input data, and the input data is written to the buffer according to starting addresses and data lengths of each of the data blocks, in which the starting addresses and the data lengths of each of the data blocks are obtained by resolving the data hot bits.

11. The data-processing circuit according to claim 10, wherein the input data is transmitted to a slave device from a master device via the data-processing circuit, the slave device reads the input data from the buffer and uses a mechanism addressing the data hot bits based on a restriction that requires the input data to align with the data addresses in the buffer during data transmission.

12. The data-processing circuit according to claim 10, wherein, before the multiple data blocks are written to the buffer, data dependency among the data blocks is firstly confirmed by comparing the data hot bits of each of the data blocks.

13. The data-processing circuit according to claim 12, wherein, if no data dependency is determined among the data blocks, the input data is directly written to the buffer; if the data dependency is determined among the data blocks, the input data is not read from the buffer until after the input data is written to the buffer.

14. The data-processing circuit according to claim 13, wherein the input data is transmitted to a slave device from a master device via the data-processing circuit, the slave device reads the input data from the buffer and uses a mechanism addressing the data hot bits based on a restriction that requires the input data to align with the data addresses in the buffer during data transmission.

15. The data-processing circuit according to claim 14, wherein a transmission of the input data to be written to the buffer is restricted by a chop size boundary defined by the width maximum input transaction size that is written to the buffer, a fixed access width of the slave device, and a bus width.

16. The data-processing circuit according to claim 15, wherein, after the input data is written to the buffer, the slave device reads data from the buffer according to information resolved from the data hot bits, in which the information resolved from the data hot bits includes the starting addresses of each of the data blocks, and the slave device retrieves the data based on the data lengths, so as to achieve an effect of masking dummy data addresses.

* * * * *